July 21, 1959  M. GAVAZZI  2,895,443
CIRCULAR MACHINE FOR THE PRESSING OF METALLIC SHEET ELEMENTS
Filed Dec. 15, 1954  4 Sheets-Sheet 1

MANLIO GAVAZZI
INVENTOR
his ATTys.

July 21, 1959  M. GAVAZZI  2,895,443
CIRCULAR MACHINE FOR THE PRESSING OF METALLIC SHEET ELEMENTS
Filed Dec. 15, 1954  4 Sheets-Sheet 2
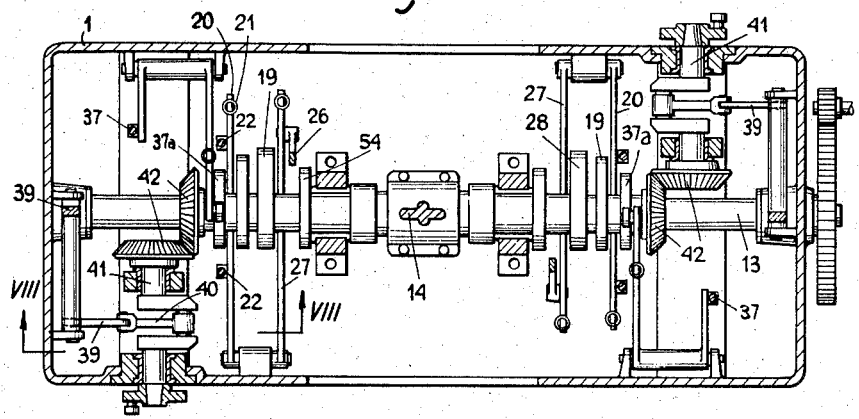
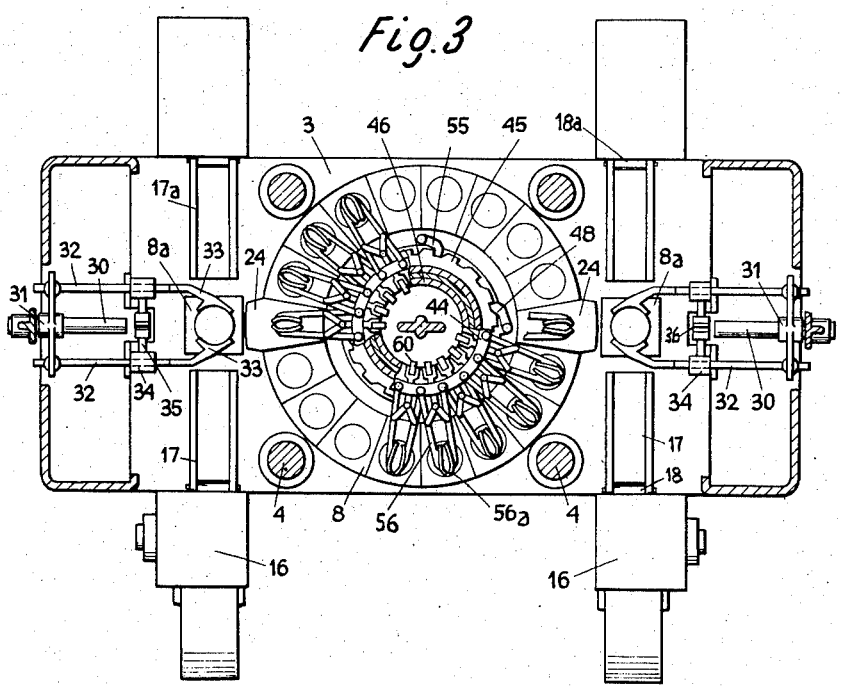
MANLIO GAVAZZI
INVENTOR
his ATT'YS.

MANLIO GAVAZZI
INVENTOR

July 21, 1959 M. GAVAZZI 2,895,443
CIRCULAR MACHINE FOR THE PRESSING OF METALLIC SHEET ELEMENTS
Filed Dec. 15, 1954 4 Sheets-Sheet 4
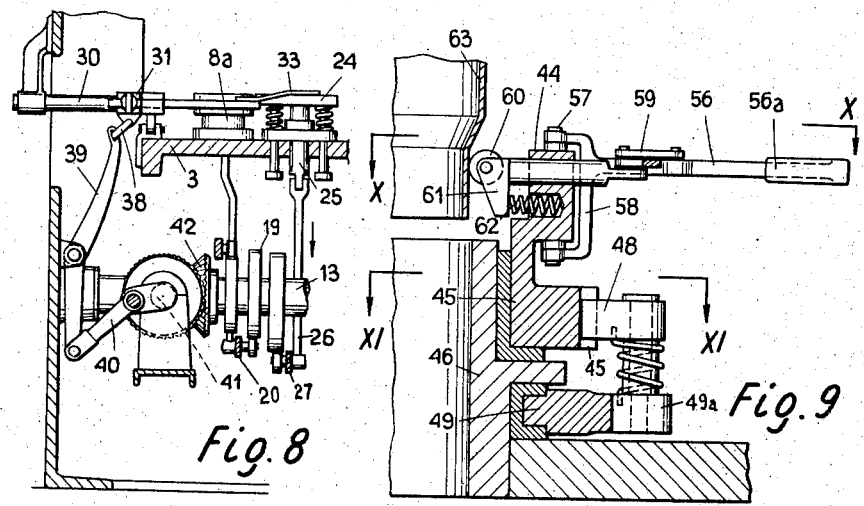
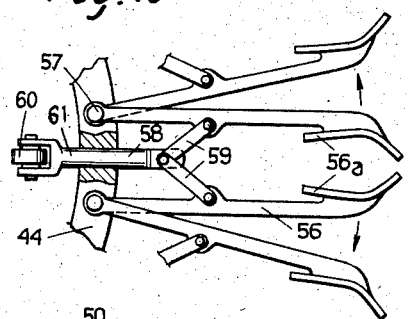
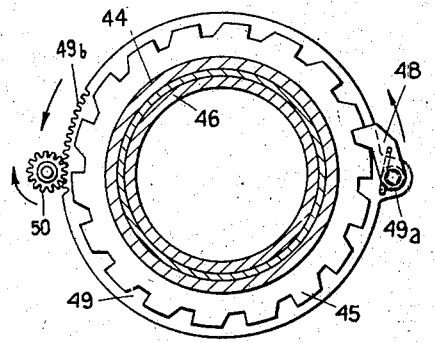
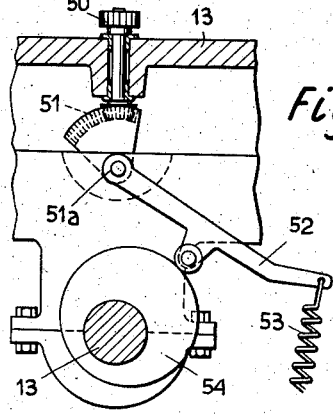
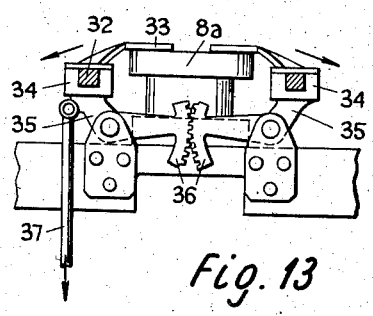
MANLIO GAVAZZI
INVENTOR
ATTYS.

United States Patent Office 2,895,443
Patented July 21, 1959

2,895,443

CIRCULAR MACHINE FOR THE PRESSING OF METALLIC SHEET ELEMENTS

Manlio Gavazzi, Florence, Italy

Application December 15, 1954, Serial No. 475,495

Claims priority, application Italy September 11, 1954

4 Claims. (Cl. 113—1)

The invention relates to a machine designed for the pressing of metallic sheet elements which are sheared and embossed and otherwise worked through a series of successive passes with working tools.

As opposed to the present machines of this kind, which are of the linear type, i.e., wherein the different work stations are aligned, the machine according to the invention is characteristically formed by a circular arrangement, since there is an assembly of dies formed by stationary elements and by elements integral to an apparatus cyclically movable relative to the stationary dies, and there is a circular conveyor designed to translate the components being manufactured from one die to the next one or from one position to the next, according to a constant angular displacement.

The machine may be provided with a very relatively high number of work stations so that it is possible to simultaneously actuate at least two independent workings, each located on one side of the dies included within a definite arc.

One of the fundamental features of the machine is that of including at least one and preferably at least two first stations or suited to start a work with the shearing and a first embossing, and which are located of a greater radial distance than the constant radial distances of the other dies, that is, of the other working positions, means being provided for the transfer of the elements being worked from the shearing and first embossing position in a or an almost radial direction towards the centre, that is, inwardly, so as to be picked up by the circular conveyor. By this arrangement, the dimensions of the sheared element may be larger than those allowed by the approached arrangement of the dies which complete the manufacture and it is also possible to obtain a continuous feeding of the metal sheet, wherefrom the elements are sheared, since said shearing position is external with respect to the circularly arranged dies.

In order to effect a regular introduction of the sheared and embossed elements in the first work position to the circular conveyor, advantageous provisions are designed for the shearing position to be located at a different level from that of the other dies, and appropriately lower than the level where the successive workings take place, and that at the lower level (or eventually at an upper level) also the inward radial transfer may occur, in such a way that the sheared and firstly embossed element may be introduced into the pincers of the circular conveyor through a lifting (or eventually a lowering even by gravity).

The invention will be better appreciated by following the description and the accompanying drawings which illustrate some embodiments of the invention. In the drawings:

Figs. 2, 3 and 4 illustrate horizontal sections along the lines II—II, III—III, and IV—IV of Fig. 1, respectively;

Fig. 8 illustrates a detail in section along the line VIII—VIII of Fig. 3;

Figs. 9, 10, 11 and 12 illustrate a vertical section, a section along the line X—X of Fig. 9, a section along the line XI—XI of Fig. 9 in a smaller scale, and a section along the line XII—XII of Fig. 1, of details of the circular conveyor and its drive device;

Fig. 13 illustrates a section of a detail along the line XIII—XIII of Fig. 1.

Figure 6:
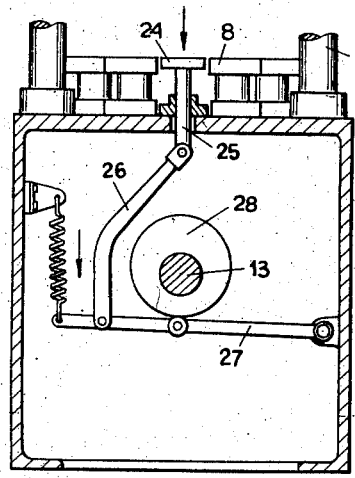
Figure 7:
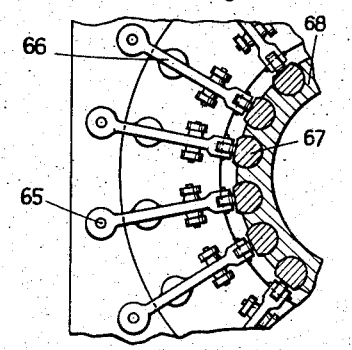
Fig. 7 illustrates a partial horizontal section along the line VII—VII of Fig. 1.

According to the drawing, 1 denotes a main frame provided with an upper girder 2 and with a bed 3. Between the bed 3 and the girder 2 there are four guide columns 4, on which a cyclically movable apparatus 5 vertically slides and of which a movable plate 6 carrying the movable parts 7 of the dies is a section thereof, while the stationary components 8 thereof (see Fig. 6) are located along a circle path on the bed 3 in a replaceable way. The components 7 of the dies are mounted on the movable apparatus 5, 6 in an adjustable way. The movable equipment 5, 6 is balanced through a piston 10 integral thereto and sliding in a cylinder 11 carried by the girder 2 and suitably fed by a compressed fluid, more particularly through compressed air, for example incoming from the tanks 12.

A main shaft 13 located on the structure 1 under the bed 3, drives the movable equipment through a crank 13a housed in the interior of a bearing 3a borne by the bed, and through a connecting rod 14.

Figure 1:
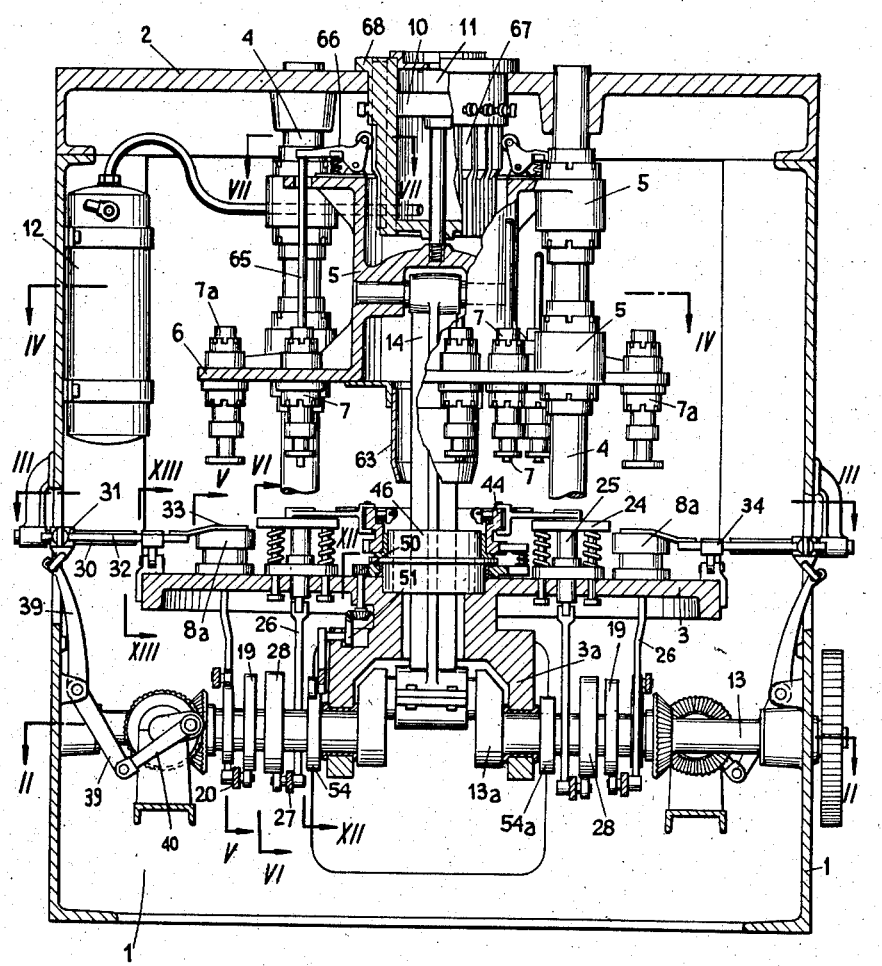
Fig. 1 illustrates a vertical longitudinal section of the machine.
Figure 4:
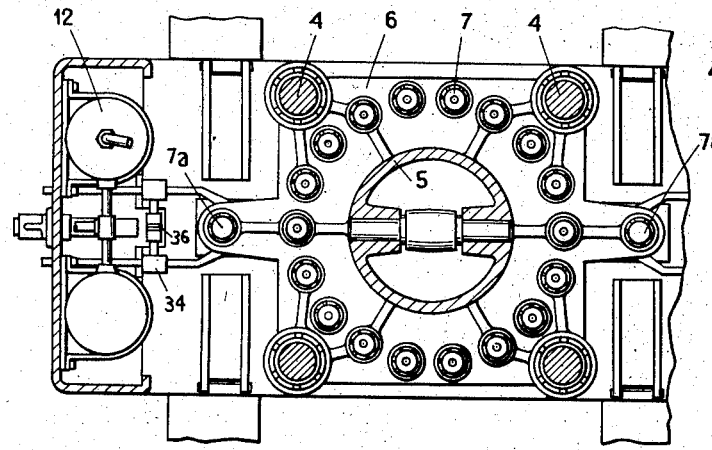
Figure 5:
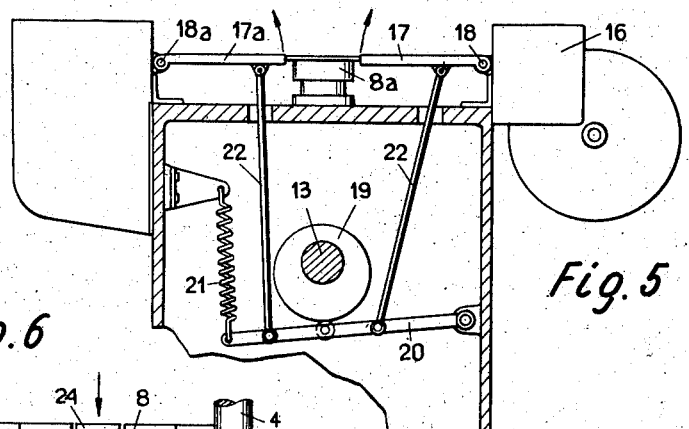
Figs. 5 and 6 illustrate local vertical sections along the lines V—V and VI—VI of Fig. 1.

In the embodiment, the machine is provided with two feed positions corresponding to two movable members 7a and to two stationary members 8a of the dies designed to the shearing and a first embossing of the sheared elements; said dies are characteristically arranged at a greater radial distance than that of the other dies 7, 8 and in the embodiment they are diametrically opposite. In this way the sheared element may have shearing dimensions greater than the distance between two adjacent dies 7, 8 and may be introduced into these dies, after having been partly embossed by one of the dies 7a, 8a and therefore reduced in its dimensions. The position of the first or preliminary dies 7a, 8a also allows a continuous feed, for example, such as the case of a strip. In fact, in the embodiment, there is a feed device 16 for each die 7a, 8a, said feed device being synchronously driven by the machine and designed to feed a metallic strip to the die 7a, 8a, said metallic strip being passed on two elements or arms 17 and 17a, acting as bridges, which are arranged one adjacent the device 16 and the other on the opposite side thereof with respect to the die 8a, said elements or arms 17, 17a being hinged at 18, 18a and synchronously lifted with the other motions of the machine after having effected a shearing and immediately lowered before the next shearing. A feed apparatus of this kind is illustrated, for example, in the Italian patent application No. 52, Reg. 39 of November 27, 1952, under the name of Giorgio Gavazzi, Società in Nome Collettivo. The control of the arms 17, 17a is effected by the shaft 13 through cams 19 (one for each die 7a, 8a), through levers 20 contacting the cam drawn by the springs 21 and connected to the arms 17, 17a through the rods 22 (see especially Fig. 5).

The stationary members 8a of the shearing dies are carried by the bed 3 in a lower position than that of the dies 8. In correspondence of said dies 8a and at a radial distance equal to that of the dies 8, there are the blocks or plates 24 forming a part of the movable equipment, vertically guided by the stem 25 on the bed 3; antagonistic springs tend to keep the blocks 24 on the upper surface at the level of the upper surface of the dies 8; said blocks 24 may be downwardly drawn—against the action of the springs—by rods 26 engaged to levers 27 pivoted on the frame 1 and co-operating with the cams 28 mounted on the shaft 13, said cams 28 being designed to lower the blocks 24 at least to the level of the dies 8a or slightly under them.

There is a device designed to transfer a sheared and partly embossed piece from each die 7a, 8a on the corresponding lowered block 24. Said conveyor device in the embodiment includes (see Figs. 1, 2, 3, 8 and 13) a longitudinal bar 30, whereon slides a sleeve 31 carrying two fins, to which two square bars 32, sliding with said sleeve 31, are engaged with a small play; said square bars are provided, at their ends, with inner shaped forks 33 for the engagement of the objects embossed by the die 7a, 8a; the square bars 32 slide in appropriate seats provided in two blocks 34 integral with a pair of parallelly and symmetrically hinged lever elements 35, and are simultaneously driven in a symmetric way through two mutually meshing geared sectors 36; pivoting of the two arms 35 about a horizontal axis is controlled by a rod 37 actuated by a cam 37a carried by the shaft 13; the longitudinal displacements of the two forks 33 are determined by the slidings of the sleeve 31 which is connected through a small connecting rod 38 to a double lever 39 controlled by a connecting rod 40 engaged to a crankshaft 41; said crankshaft is rotarily controlled by the shaft 13 through the bevel gears 42. In this way, through an appropriate synchronism between the longitudinal displacements of the sleeve 31 and therefore of the square bars 32 connected thereto in an articulated way, and through the extension and approach of said square bars obtained through symmetric angular motions of the arms 35, the forks 33 may be tightened on the sheared piece, partly embossed by the die 7a, 8a, and transfer it on the corresponding lowered block 24 which is at the same radial distance as the dies 8; the lifting of the block 24 then takes the piece up to the level of the dies 8.

Coaxially to the rim of the dies 7, 8, there is a circular conveyor for the pieces being manufactured to displace the latter in an arcuate path along the circle. Said circular conveyor includes a ring 44 integral to an inclined toothed rim 45 and housed in a circular element 46 carried by the bed 3; a pawl or dog 48 is designed to co-operate with the rim 45 in order to trip it according to an angular magnitude corresponding to that between two successive dies; accordingly, the dog 48 is pivoted in the lug 49a of a ring 49 engaged independently but coaxially to the ring 45 on the piece 46; said ring 49 is cyclically and alternatively moved in the two directions through a pinion 50 meshing a toothed arc 49b of the ring 49; said geared pinion 50 being driven by a geared sector 51 (also see Fig. 12) which is oscillated around its own axle 51a through a lever 52 integral to said axle 51a and driven against the action of an antagonistic spring 53 by a cam 54 driven by the shaft 13. A cam 54a, symmetrical with respect to cam 54, suitably drives a control pin 55 designed to penetrate among the teeth of the rim 45 only when the latter and therefore only when the ring 44 reach the correct dwelling positions, to allow the lowering of the movable equipment 5.

The ring 44 carries a number of clamps or pincers equal to the number of the dwelling positions or of the dies 8, 8a some of which also being idle, pincers equally angularly spaced. Each pincer (especially see Figs. 9 and 10) includes two rods 56 pivoted at 57 to the ring 44 and being provided with the fork ends 56a with their concave surfaces in opposition; said forks 56a are inclined in such a way that they may engage elements of different diameter, such as those obtained during the work, and substantially with the axis equidistant from the central axis of the machine and to the symmetry axis of the dies; more particularly, the fingers of each fork are inclined relative to each other as well as relative to the corresponding rod of arm 56. In this way, any pincer may seize a piece being worked and having any diameter and carry it from one die to the next. The drive of the rods 56 is obtained through a guide 58 radially sliding in the ring 44 and connected through a connecting rod 59 to the rods 56; the guide 58 is at its inner end provided with a drive roller 60 and a heel 61 against which an antagonistic spring 62 acts and tends to push the guide 58 inwardly and to close the fingers 56, 56a. A profile 63 is engaged to the movable equipment 5, 6 and said profile 63 being lowered with the movable equipment determines an outward displacement of the guides 58 through the rollers 60, and therefore the pincers 56, 56a opened from the pieces which then can be worked. The pincers may be all opened in the same way if the profile 63 is a rotary one, or in a different way if the profile 63 is formed by elements.

Therefore the following operations are synchronously and timely effected: the lowering of the movable equipment, the opening of the pincers, the pressing of the pieces introduced by the pincers into the active dies, the lifting of the movable equipment and consequently the locking of the pincers, and immediately after, the transfer, operated by the pincers, from one die to the adjacent one through the device denoted by 54, 52, 51, 50, 49, 48. Then the following operations are synchronously and timely effected after the shearing and the first embossing on the dies 7a, 8a: the locking of the pincers 33 on the piece in correspondence of the die 8a, the lifting of the bridge arms 17, 17a in order to allow the transversal displacement of the piece, the transfer of said piece on the corresponding block 24 lowered by the device 25, 26, 28; successively, after the extension and the return of the conveyor 32, 33, the lifting of the block 24 which is thus located at the level of the dies 8 and between the opened fingers 56a of the pincer which in this moment is located in the radial position corresponding to the block 24.

For the control of the expulsion of the pressed pieces from the dies 7, there may be, in correspondence of each die 7, a rod 65 which controls the expeller and a rocker lever 66 which controls said rod and which is located in the upper section of the movable equipment 5. Said rocker levers 66 are provided with rollers with which the profiles 67, adjustably applied on the body 68 forming the cylinder 11, co-operate; in this way, the rockers 66 determine the regular expulsion of the pressed pieces, whichever their height dimension may be.

Having, as in the embodiment, a machine with two feed positions corresponding to the dies 7a, 8a, it is possible to simultaneously provide for the manufacture of two different pieces, which are pressed in mass production through a remarkable number of dies, in the embodiment eight or nine. It is apparent that when having three or more feed positions, it is possible to provide for the simultaneous manufacture of three or more pieces in mass production. By feeding a single position, it is possible to provide for the working of pieces requiring a high number of pressing stages, in the embodiment sixteen or seventeen. The machine in question may also effect the production of threading, flanging, knurling, marking and the like by rolling the pressed elements.

It is to be intended that the drawings only show schematic embodiments given only as a practical demonstration of the invention, which may be varied in the form and arrangements, without however departing from the ambit of the concept which informs said invention.

What I claim is:

1. A machine for shearing strip material into elements and working upon said elements, comprising a bed, a plurality of different stationary working dies arranged on said bed in a circle, a movable plate concentric with said circle and arranged for substantially vertical displacement relative to said working dies, a plurality of dollies on said movable plate for movement toward and away from said working dies respectively, a stationary shearing and embossing die located adjacent and outwardly of said working dies to provide a free marginal working area about said preliminary die greater in radial extent than the corresponding free marginal working area about each of said plurality of dies, a shearing and embossing dolly on said movable plate and positioned opposite said shearing and embossing die, means for feeding strip material to said shearing and embossing die to be worked thereon by said shearing and embossing dolly to form an element, means for arcuately displacing elements on said bed along said circle to successively different positions to be received by said working dies in sequence, means for radially and inwardly displacing an element formed on said shearing and embossing die to a position on said circle, means for intermittently actuating said arcuately and said radially displacing means substantially simultaneously to thereby effect substantially simultaneous arcuate displacement of elements along said circle from one die to the successive die and radial displacement of an element on said shearing and embossing die to a position on said circle, and means for intermittently carrying said movable plate with all of said dollies toward the respective dies simultaneously, said actuating means and said carrying means operating alternately, whereby an element is sheared from said strip material and embossed by said shearing and embossing die simultaneously with working of other elements by said working dies, all of said elements then advancing to the next successive operation.

2. A machine as defined in claim 1, including a first ring coaxial with said movable plate, said arcuately displacing means including a plurality of clamps on said first ring, means for opening and closing said clamps, and means for rotating said first ring about its axis to thereby carry each clamp between one working die and the next successive working die.

3. A machine as defined in claim 2, wherein said first ring is provided with ratchet teeth in its periphery, said rotating means including a second ring coaxial with said first ring and provided with gear track, a spring urged pawl pivotally mounted on said second ring and engaging a tooth of said first ring, and oscillating means operatively connected with said second ring through said gear track, whereby upon each oscillation of said second ring through said oscillating means, said first ring is advanced one tooth by means of said pawl to thereby carry said clamps from one working die to the next successive working die.

4. A machine for die-forming elements, comprising a bed, a plurality of different stationary working dies arranged on said bed in a circle, a movable plate concentric with said circle and arranged for substantially vertical displacement relative to said working dies, a plurality of dollies on said movable plate for movement toward and away from said working dies, respectively, means for feeding an element to the first working die, means for intermittently carrying said movable plate with all of said dollies toward their respective dies simultaneously, a ring coaxial with said movable plate, and means for intermittently arcuately displacing elements on said bed along said circle to successively different positions to be received by said working dies in sequence, said arcuately displacing means including a plurality of clamps on said ring, means for opening and closing said clamps, and means for intermittently rotating said ring about its axis to thereby carry each clamp with an element from one die to the next adjacent die along said circle.

References Cited in the file of this patent
UNITED STATES PATENTS

| | | |
|---|---|---|
| 1,039,643 | Brown | Sept. 24, 1912 |
| 2,147,566 | Williams | Feb. 14, 1939 |
| 2,348,464 | Geertsema | May 9, 1944 |

FOREIGN PATENTS

| | | |
|---|---|---|
| 688,046 | Great Britain | Feb. 25, 1953 |